US012482995B2

United States Patent
Huang et al.

(12) United States Patent
(10) Patent No.: US 12,482,995 B2
(45) Date of Patent: Nov. 25, 2025

(54) ELECTRICAL CONNECTOR WITH A POSITIVELY RETAINED METALLIC COVER

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventors: Teng Huang, Shenzhen (CN); De-Jin Chen, Shenzhen (CN)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 328 days.

(21) Appl. No.: 18/219,863

(22) Filed: Jul. 10, 2023

(65) Prior Publication Data

US 2024/0022031 A1 Jan. 18, 2024

(30) Foreign Application Priority Data

Jul. 13, 2022 (CN) ........................ 202221810352.X

(51) Int. Cl.

| | |
|---|---|
| ***H01R 24/50*** | (2011.01) |
| ***H01R 13/514*** | (2006.01) |
| ***H01R 13/6587*** | (2011.01) |

(52) U.S. Cl.

CPC ........... *H01R 24/50* (2013.01); *H01R 13/514* (2013.01); *H01R 13/6587* (2013.01); *H01R 2201/26* (2013.01)

(58) Field of Classification Search

CPC .............. H01R 13/514; H01R 13/6587; H01R 13/6585; H01R 13/6588; H01R 13/6594; H01R 24/50; H01R 2201/26

(Continued)

(56) References Cited

U.S. PATENT DOCUMENTS

| | | | |
|---|---|---|---|
| 5,088,937 | A | 2/1992 | Gabany |
| 5,215,470 | A | 6/1993 | Henry et al. |

(Continued)

FOREIGN PATENT DOCUMENTS

| | | |
|---|---|---|
| CN | 206271943 U | 6/2017 |
| CN | 212848965 U | 3/2021 |

(Continued)

*Primary Examiner* — Gary F Paumen

(74) *Attorney, Agent, or Firm* — Ming Chieh Chang

(57) ABSTRACT

An electrical connector includes: a metallic housing having a base portion and at least one tube portion extending, the tube portion defining a first cavity opening forwards, the base portion defining a second cavity communicating with the first cavity, the second cavity opening rearward and downwards, at least one terminal module received in the first cavity and the second cavity, each terminal module including an insulator and at least one terminal retained in the insulator, the terminal having a contacting portion and a leg portion extending out of the insulator; and a metallic cover attached to a rear face of the base portion of the metallic housing, wherein the base portion defines at least two stopping portions blocking against a rear of the metallic cover, and the at least two stopping portions are formed by extruding and deforming the rear face of the base portion.

13 Claims, 8 Drawing Sheets

(58) Field of Classification Search
USPC ..... 439/578, 607.13, 607.35, 607.55, 607.57
See application file for complete search history.

(56) References Cited

U.S. PATENT DOCUMENTS

| | | | | |
|---|---|---|---|---|
| 7,789,706 B2 * | 9/2010 | Chen | H01R 12/712 439/660 |
| 8,366,486 B1 * | 2/2013 | Lan | H01R 24/64 439/607.54 |
| 8,834,206 B2 * | 9/2014 | Tao | H01R 13/6581 439/607.19 |
| 2012/0115362 A1 * | 5/2012 | Zhang | H01F 27/363 439/607.35 |
| 2014/0308849 A1 * | 10/2014 | Hsu | H01R 13/6581 439/607.55 |

FOREIGN PATENT DOCUMENTS

| | | |
|---|---|---|
| CN | 114204309 U | 3/2022 |
| EP | 3618194 A1 | 3/2020 |

* cited by examiner

ELECTRICAL CONNECTOR WITH A POSITIVELY RETAINED METALLIC COVER

BACKGROUND OF THE INVENTION

1. Field of the Invention

The present invention relates to an electrical connector with a metallic cover attached to a metallic housing.

2. Description of Related Arts

China Patent No. 206271943 discloses a car RF connector. A cover of the RF connector is retained in a T-shaped groove defined on a metallic housing thereof by interference fit. In an environment subject to vibration, the cover retained by interfered force may tend to become loose from the metallic housing.

An improved electrical connector is desired.

SUMMARY OF THE INVENTION

The instant invention is to provide an electrical connector for fitly retaining a cover thereon.

To achieve the above-mentioned object, an electrical connector comprises: a metallic housing comprising a base portion and at least one tube portion extending forward from the base portion, the at least one tube portion defining a first cavity opening forwards, the base portion defining a second cavity communicating with the first cavity, the second cavity opening rearward and downwards; at least one terminal module received in the first cavity and the second cavity, each terminal module comprising an insulator and at least one terminal retained in the insulator, the terminal comprising a contacting portion and a leg portion extending out of the insulator; and a metallic cover attached to a rear face of the base portion of the metallic housing, wherein the base portion defines at least two stopping portions blocking against a rear of the metallic cover, and the at least two stopping portions are formed by extruding and deforming the rear face of the base portion.

Figure 1:
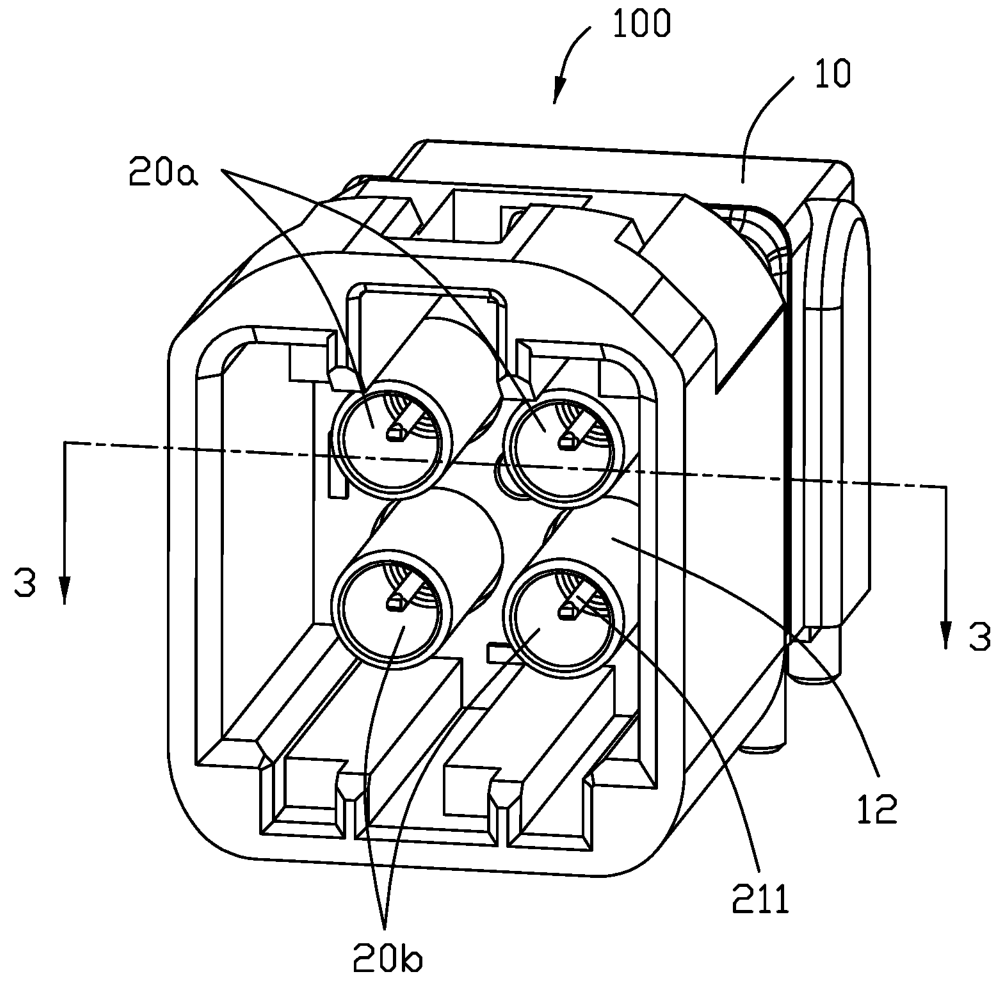
FIG. 1 is a front perspective view of an electrical connector in accordance with the present invention.
Figure 2:
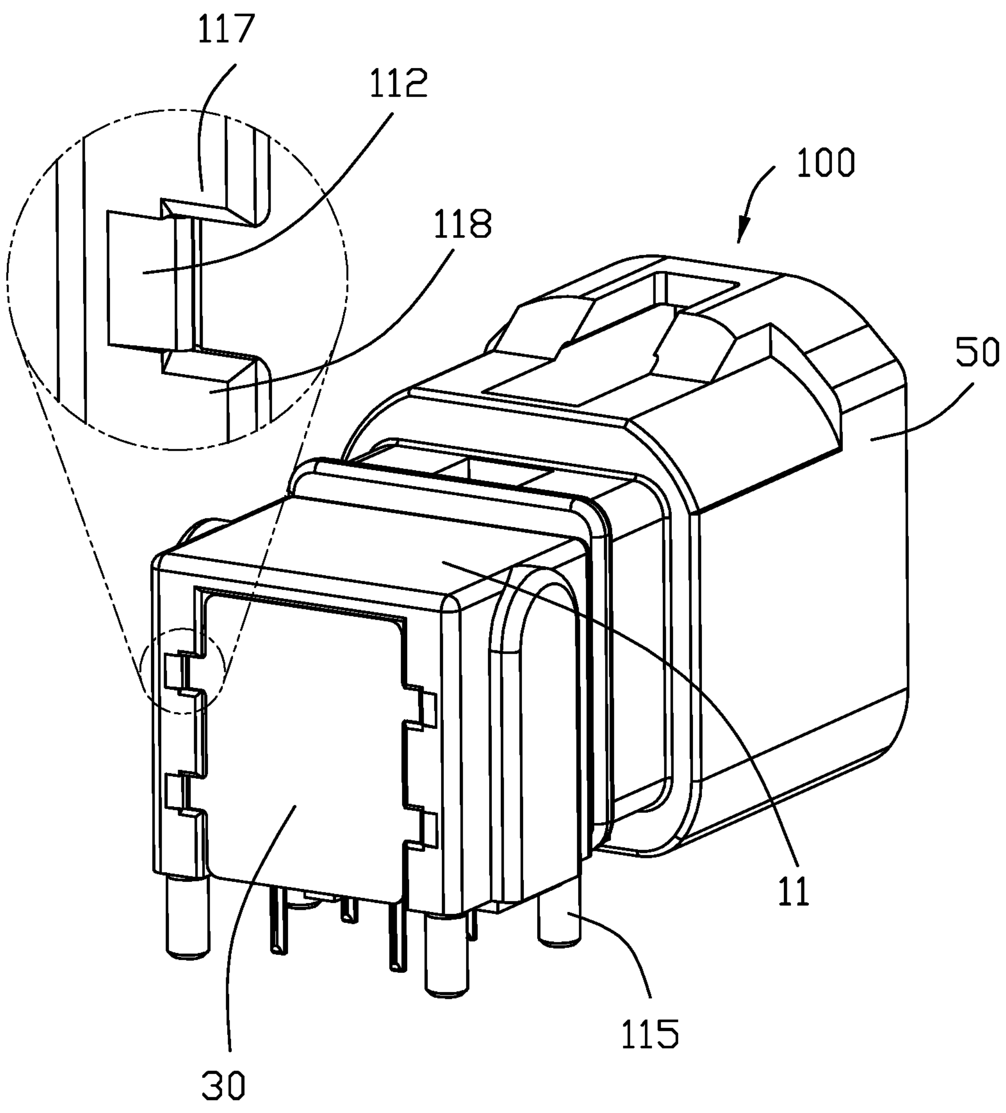
FIG. 2 is a rear perspective view of the electrical connector in FIG. 1.
Figure 3:
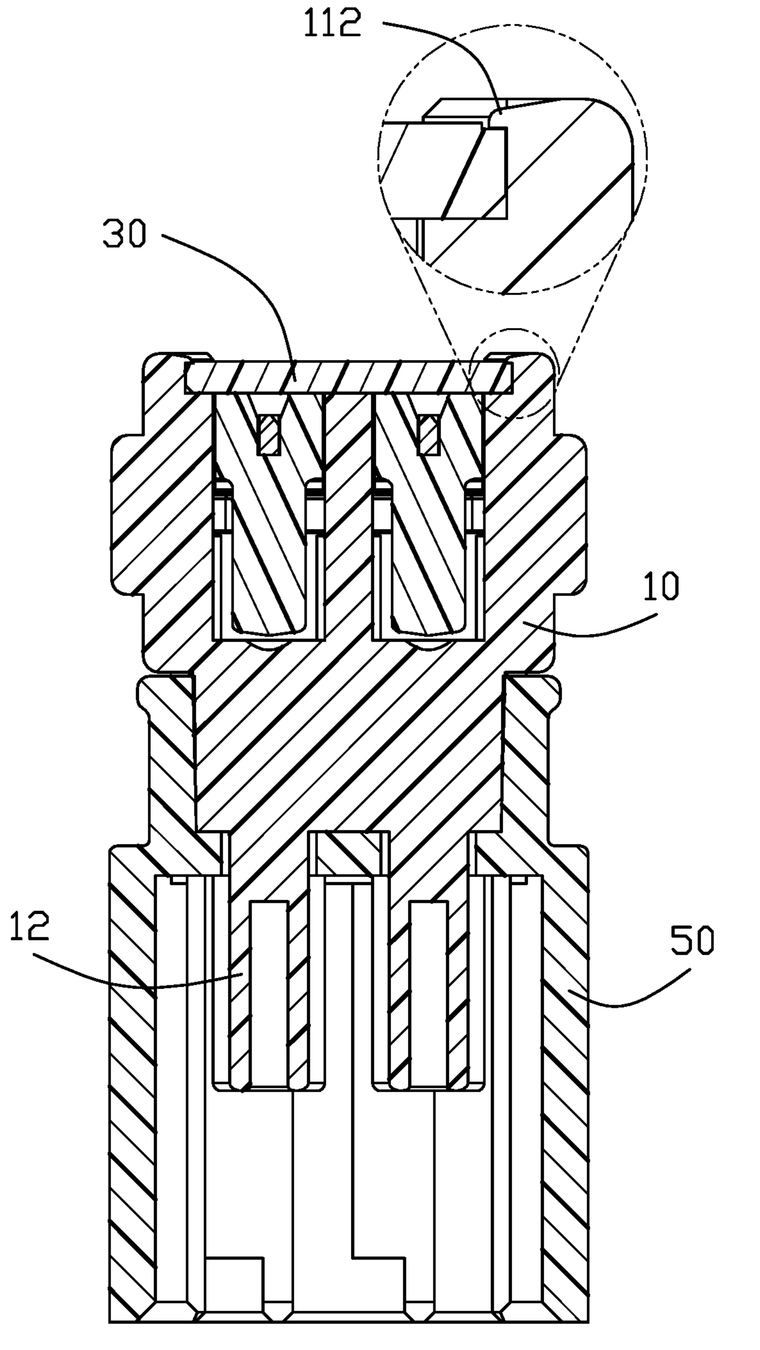
FIG. 3 is a cross-sectional view of the electrical connector taken along line 1-1 in FIG. 1.

Other advantages and novel features of the invention will become more apparent from the following detailed description of the present embodiment when taken in conjunction with the accompanying drawings.

DETAILED DESCRIPTION OF THE PREFERRED EMBODIMENT

Reference will now be made in detail to the preferred embodiments of the present invention.

Referring to FIGS. 1-8, an electrical connector 100 is adapted for being mounted on a PCB and adapted for mating with a cable plug connector, transmitting signals in a vehicle or the like. The electrical connector 100 include a metallic housing 10 and at least one terminal module 20 retained with the metallic housing 10. The housing 10 defines a front face confronting with the cable plug connector, and a mounting face confronting with the PCB. The housing 10 is preferable made from metal cast, which includes a base portion 11 and at least one tube portion 12, in this embodiment, four tube portions 12 in a 2×2 array pattern extending forwards from the base portion 11. The tube portion 12 defines a first/front cavity 121 opening forwards, the base portion 11 defines a second/rear cavity 111 communicating with the first cavity 121, the second cavity 111 opens rearwards through a rear face of the base portion 11, downward through the lower face of the base portion 11. The terminal module 20 includes an insulator 21 and a metallic conductive terminal 22 retained in the insulator 21. The terminal 22 includes a contacting portion 221 extending forward from the insulator 21 and a leg portion 222 extending downward from the insulator 21. The insulator 21 is retained within the first cavity 121 and the second cavity 121, the contacting portions 221 exposes to the first cavity 121 of the tube portion 12, the leg portions 222 extend through the lower face of the base portion 11. A metallic cover 30 is attached to the rear face of the base portion 11, for improving the shielding performance of the electrical connector 100. Preferably, a lower edge of the cover 30 is lower or flushed with a lower edge of the insulator 21. The base portion 11 defines a pair of stopping portions 112 blocking against the rear cover 30 for preventing the cover 30 from falling from the base portion 11. The stopping portions 112 are formed by the deformation of the base portion 11 after the rear face of the base portion 11 is extruded by a tool after the cover 30 is assembled to the base. The metallic housing 10 is made from a softer metal, zinc alloy, the cover 30 is made from copper alloy.

Figure 4:
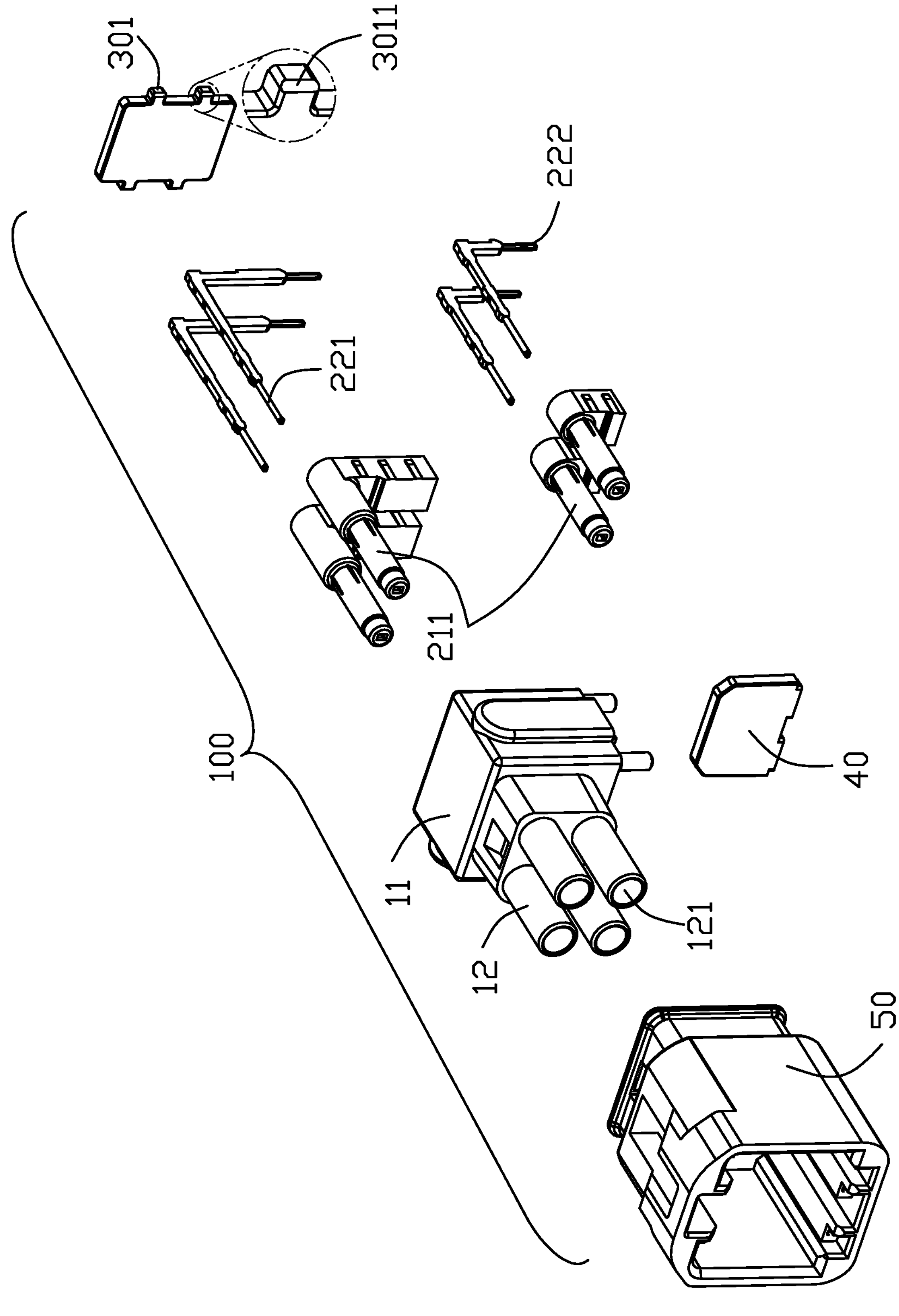
FIG. 4 is an exploded view of the electrical connector in FIG. 1.
Figure 5:
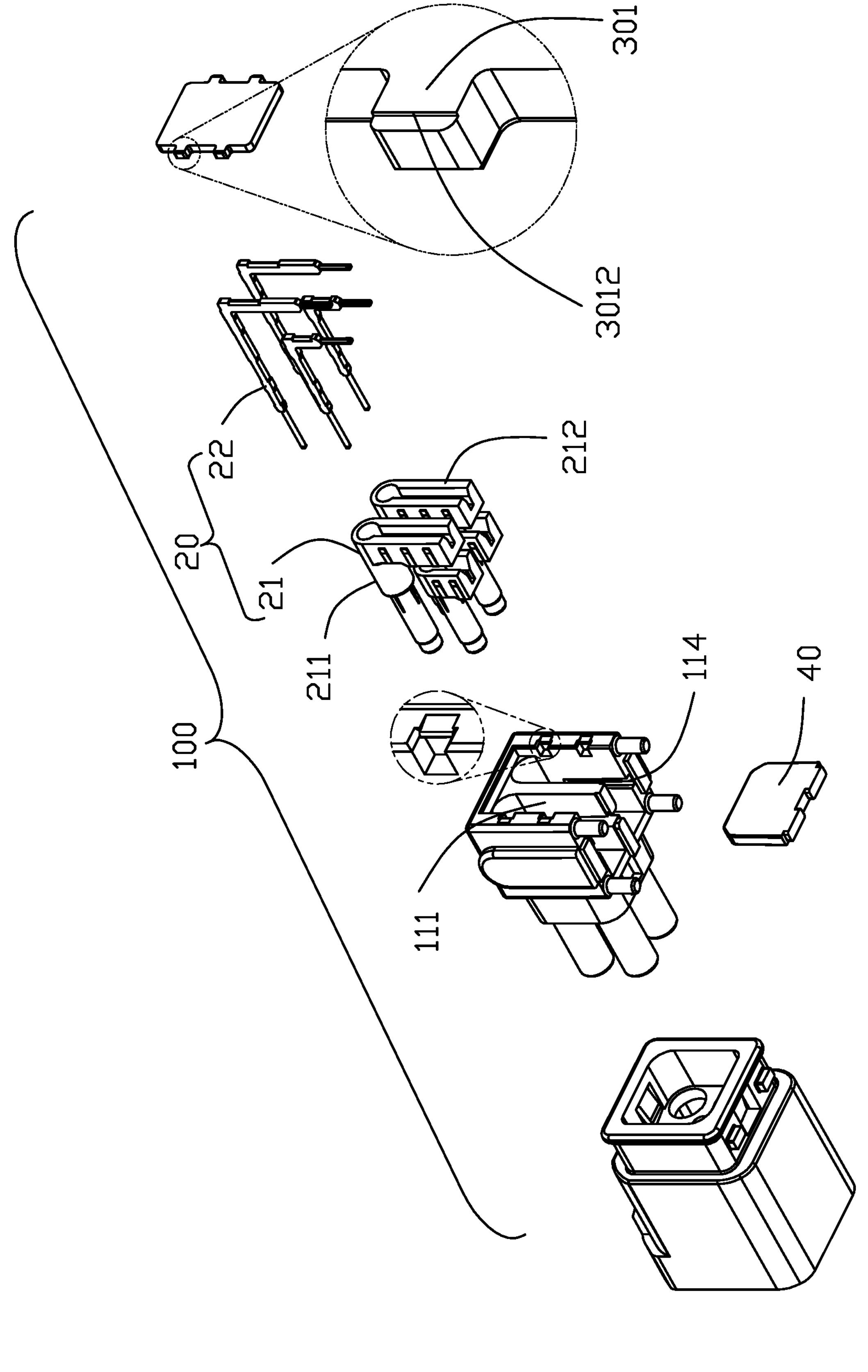
FIG. 5 is another exploded view of the electrical connector in FIG. 4.
Figure 6:
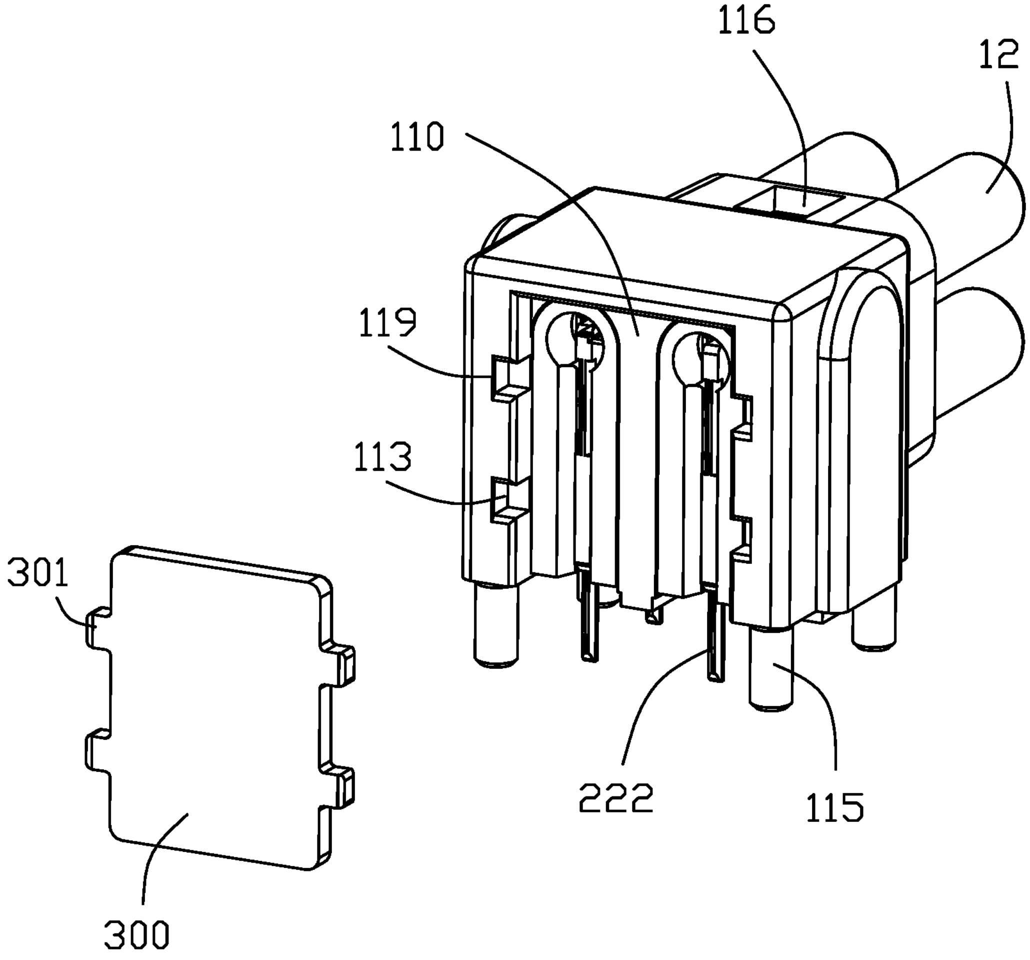
FIG. 6 is an exploded perspective view of the metallic housing with the terminal module, but the metallic cover is ready to assemble to the metallic housing.

Referring to FIGS. 2-7, the base portion 11 defines at least two recesses 113, four recesses in this embedment, on the rear face thereof, each recess 113 defines a top side 117, a lower side 118, and a lateral side 119. The cover 30 includes a main portion 300 and four protruding portions 301. The protruding portions 301 are used to be received in corresponding recesses 113 for preliminary position of the cover 30 on the base portion 11 as shown in FIG. 6. Then the upper side 117, the lower side 118 and the lateral side 119 or one or two of them are extruded and deform to form the stopping portions 112, fitly retaining the cover 30 on the rear face of the base portion 11. Preferably, the protruding portion 301 defines a guiding slant face 3011 to guide the protruding portion to enter into the recess 113. The protruding portion 301 defines a recessed portion 3012 at a rear face thereof. The stopping portion 112 formed with the deformation of the lateral side 119 can enter in the recesses portion 3012. Referring to FIG. 6, the base portion 11 define a shallow cavity 110 at the rear face thereof, the main portion 300 is received in the shallow cavity 110, the recesses 113 are disposed at opposite side edges around the shallow cavity 110, so that the cover 30 is located in front of or flushed with the rear face of the base portion 11. That is, the base portion defines the shallow cavity with side edges around the shallow cavity. The side edges around the shallow cavity are extruded and deform to form the stopping portions after the metallic cover 30 is assembled in the shallow cavity so that the stopping portions 113 press against the metallic cover 30.

Referring to FIGS. 4-5, the terminal 22 is L-shaped, the insulator 21 has a corresponding shape with the terminal retained in the insulator 21 and includes a horizontal portion 211 and an upright portion 212, the contacting portion 221 extends forwards from the horizontal portion 211, and the leg portion 222 extends downward from the upright portion 212. In this embodiment, four terminal modules 20 are disposed in the connector 100, two first terminal modules 20*a* on an upper row and two second terminal modules 20*b* on a lower row. The contacting portions 221 of the first terminal modules are located at the upper row, the contacting portions 221 of the second terminals modules are located at the lower row thereof. The upright portions 212 of the first terminal modules are located at a rear row and the upright portions 212 of the second terminal modules are located at a front row in front of the rear row. A shielding plate 40 is disposed between the rear row and the front row of the upright portions, which is received and retained in the base portion 11. The base portion 11 defines a pair of sliding slots 114 through the bottom face thereof, the shielding plate 40 enters into and retained in the sliding slots 114.

Figure 7:
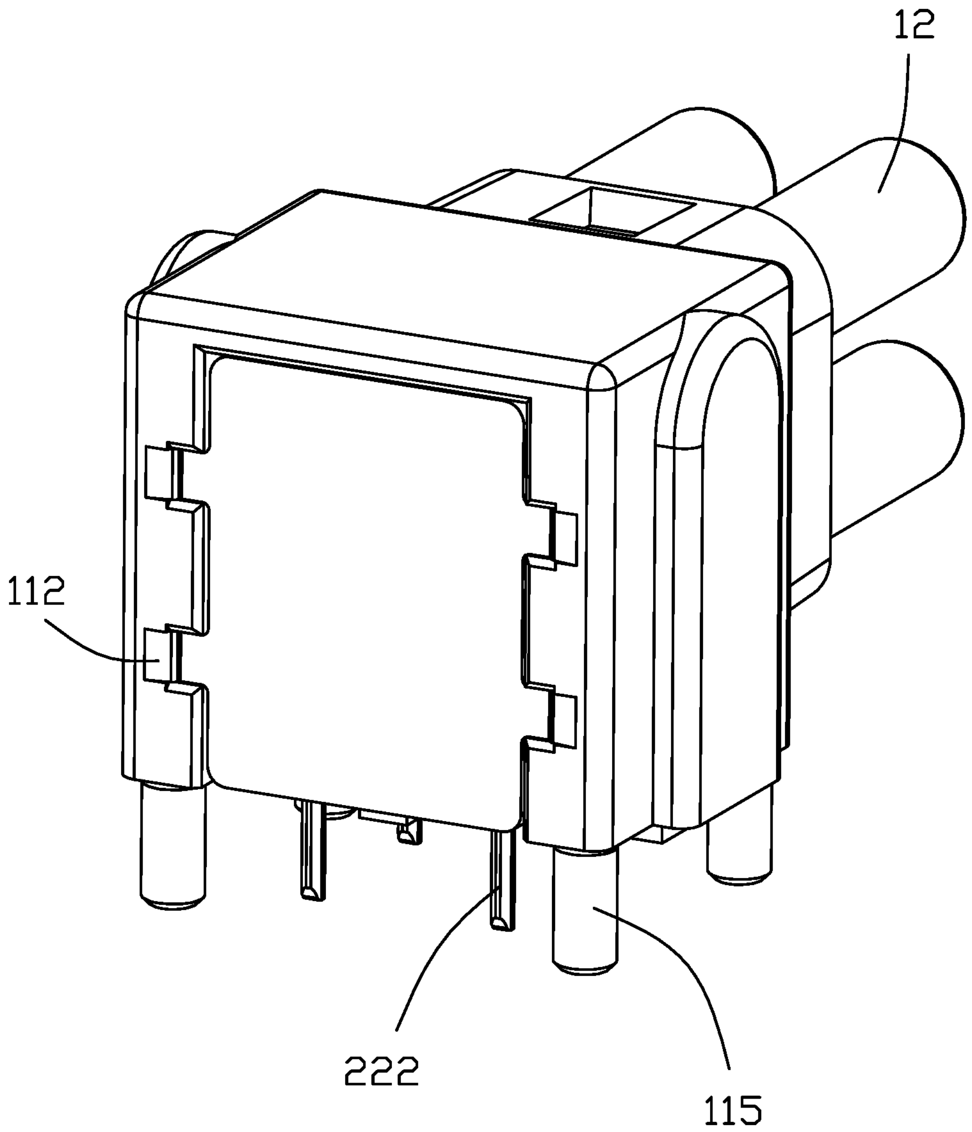
FIG. 7 is a perspective view of the metallic housing with the terminal module, and the metallic cover is retained on the metallic housing.

Referring to FIGS. 6-7, the metallic seat 10 defines several soldering legs 115 extending from the bottom face thereof, which are inserted into holes defined on the PCB. The soldering legs 115 has a same length with the leg portions 222, to ensure the soldering legs and the leg portions 222 can insert into the holes of PCB at a same time.

Figure 8:
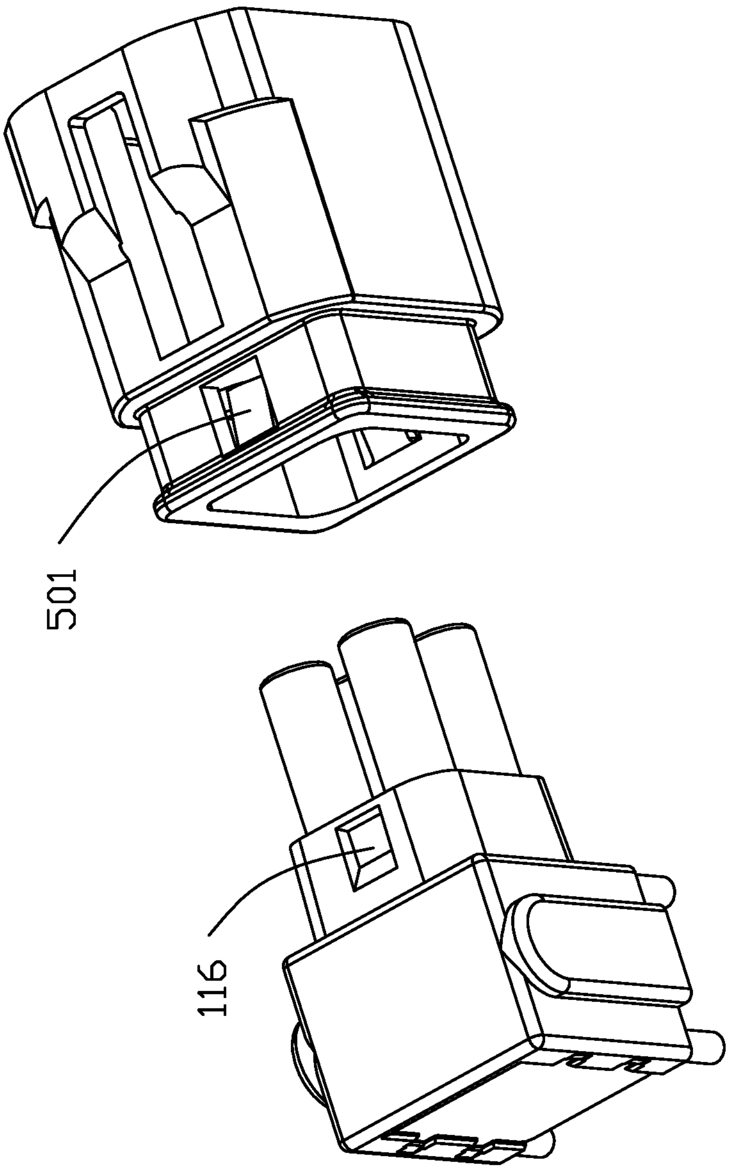
FIG. 8 is an exploded perspective view of the electrical connector.

Referring to FIG. 8, the metallic housing 10 is surrounded with an insulating shell 50 to define a mating cavity between the metallic seat and the insulating shell 50 for mating with a cable plug connector. The housing 10 defines a locking opening 116, the insulating shell 50 defines a locking tab 501 locking and retaining with the locking opening 116. Alternatively, one more locking opening is defined on a lower end of the insulating shell 50.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:

a metallic housing comprising a base portion and at least one tube portion extending forward from the base portion, the at least one tube portion defining a first cavity opening forwards, the base portion defining a second cavity communicating with the first cavity, the second cavity opening rearward and downwards;

at least one terminal module received in the first cavity and the second cavity, each terminal module comprising an insulator and at least one terminal retained in the insulator, the terminal comprising a contacting portion and a leg portion extending out of the insulator; and a metallic cover attached to a rear face of the base portion of the metallic housing;

wherein the base portion defines at least two stopping portions blocking against a rear of the metallic cover, and the at least two stopping portions are formed by extruding and deforming the rear face of the base portion.

2. The electrical connector as claimed in claim 1, wherein the base portion defines at least two recesses at the rear face thereof, the metallic cover defines protruding portions received in the corresponding recesses, and the stopping portions press forward against corresponding protruding portions.

3. The electrical connector as claimed in claim 2, wherein the base portion defines an upper side, a lower side, and a lateral side around the recess at the rear face thereof, and the stopping portion is formed by extruding the lateral side around the recess.

4. The electrical connector as claimed in claim 3, wherein the protruding portion defines a guiding slant face at a front face thereof for guiding the metallic cover into the recess, and the protruding portion defines a recessed portion at a rear face thereof for receiving the stopping portion.

5. The electrical connector as claimed in claim 1, wherein the terminal is of an L shape, the insulator is of an L shape and comprises a horizontal portion and an upright portion, the contacting portion of the terminal protrudes from a front end of the horizontal portion, and the leg portion of the terminal protrudes from a lower end of the upright portion.

6. The electrical connector as claimed in claim 5, wherein there are four terminal modules which comprises two first terminal modules and two second terminal modules disposed in the metallic housing, the contacting portions of the first terminal modules are located at an upper row, the contacting portions of the second terminal modules are located at a lower row, and the leg portions of the first terminal modules are located behind the leg portions of the second terminal modules.

7. The electrical connector as claimed in claim 6, wherein a shielding plate is disposed between the leg portions of the first terminal modules and the leg portions of the second terminal modules, the base portion defines two sliding slots opening downwards, and two opposite sides of the shielding plate slide in and are retained in the sliding slots.

8. The electrical connector as claimed in claim 1, wherein the metallic seat is made from zinc alloy.

9. The electrical connector as claimed in claim 1, wherein the metallic housing defines plural soldering legs extending downwards from a bottom thereof, and the soldering legs and the leg portions have a same length.

10. The electrical connector as claimed in claim 1, wherein the electrical connector comprises an insulating shell surrounding the metallic housing and defines a locking tab which is locked with a locking opening defines on the metallic housing.

11. An electrical connector comprising:

a metallic housing comprising a base portion, the base portion defining a shallow cavity with side edges around the shallow cavity at a rear face thereof;

a terminal module retained in the metallic housing and comprises a conductive terminal; and a metallic cover retained in the shallow cavity of the base portion;

wherein the side edges around the shallow cavity are extruded and deformed to form plural stopping portions after the metallic cover is assembled in the shallow cavity, and the plural stopping portions press forwards against the metallic cover.

12. The electrical connector as claimed in claim 11, wherein two opposite side edges of the side edges around the shallow cavity each define one or more recesses, the metallic cover defines protruding portions received in corresponding recesses, and the stopping portions press against corresponding protruding portions.

13. The electrical connector as claimed in claim 12, wherein the protruding portion defines a guiding slant at a first face thereof facing the base portion, and a recessed portion at a second face opposite to the first face.

* * * * *